United States Patent [19]
McLaughlin

[11] Patent Number: 5,193,482
[45] Date of Patent: Mar. 16, 1993

[54] METHOD OF KEEPING CAPTIVE ZEBRA MUSSELS ALIVE

[76] Inventor: Frank C. McLaughlin, 1432 Duffield Rd., Lennon, Mich. 48449

[21] Appl. No.: 940,644

[22] Filed: Sep. 4, 1992

[51] Int. Cl.⁵ .............................................. A01K 61/00
[52] U.S. Cl. ....................................................... 119/4
[58] Field of Search ..................... 119/2, 3, 4; 426/805

[56] References Cited

U.S. PATENT DOCUMENTS

| | | | |
|---|---|---|---|
| 3,298,354 | 1/1967 | Goer | 119/4 |
| 3,306,256 | 2/1967 | Lewis | 119/3 |
| 3,592,168 | 7/1971 | Claus | 119/4 |
| 3,870,020 | 3/1975 | Hunt | 119/4 |
| 4,080,930 | 3/1978 | Pruder et al. | 119/4 |
| 4,202,291 | 5/1980 | Kominami et al. | 119/3 |

*Primary Examiner*—Gene Mancene
*Assistant Examiner*—Todd E. Manahan
*Attorney, Agent, or Firm*—James C. McLaughlin

[57] ABSTRACT

A process for keeping Zebra mussels alive for extended periods of time in a laboratory environment is disclosed. The preferred embodiment of the process involves securing live, wild Zebra mussels from one of the Great Lakes and submerging them in an aerated, water-containing vessel. An agitated mixture of water and compressed, freeze-dried brine shrimp is added once a day to the vessel.

13 Claims, No Drawings

METHOD OF KEEPING CAPTIVE ZEBRA MUSSELS ALIVE

TECHNICAL FIELD OF THE INVENTION

The technical field of the present invention is that of methods and processes used to keep alive captive Zebra mussels for extended periods of time.

BACKGROUND INFORMATION

The Zebra mussel (scientific name *Dreissena polymorpha*) is native to the waters of the Black Sea and was inadvertently introduced into the waters of the Great Lakes in the mid 1980s. The maximum size of a Zebra mussel is about 35 millimeters and its shell has a banding of light and dark stripes reminiscent of the coloring of the African Zebra. It is generally believed that the introduction into the Great Lakes first took place near the western tip of Lake Erie, and Zebra mussels were probably brought there on ocean-going ships either attached to their hulls or in off-loaded ballast.

The waters of the Great Lakes proved to be a favorable habitat for Zebra mussels, and their numbers and range increased rapidly. Presently they are found along the shores of the Great Lakes and even in some inland lakes and rivers. Zebra mussels attach themselves to under-water objects with a very effective cement. This cement is called byssus and is associated with byssals threads, which are protein-based strands that the mussels exude.

Unfortunately, the Zebra mussel creates major problems, particularly when present in the huge numbers now encountered. Inlets for drinking water or water for cooling power plants that are placed out into one of the Great Lakes have become nearly blocked with Zebra mussels. Large sums of money and significant effort have been expended to drench the inlets with chlorine or other chemicals to kill the Zebra mussels, and then a staggering effort is expended to remove the dead Zebra mussels. U.S. Pat. Nos. 5,062,967, 5,040,487, and 5,015,395 disclose such methods. The hulls and even propellers of ships and boats plying the Great Lakes become fouled with attached Zebra mussels with resultant reductions in efficiency and increases in the cost of maintanance. Anti-fouling coatings appear to be ineffective. The voracious appetites of, and huge numbers of, Zebra mussels have severely disrupted the aquatic food chain. It has been noted that certain relatively shallow costal waters that were opaque with plankton are now clear. Sport fishing in the Great Lakes is of great economic importance and is likely to be adversely affected by the presence of Zebra mussels.

The need for means to control the number of Zebra mussels and the need for an anti-fouling means for preventing Zebra mussels from attaching themselves to underwater objects is clearly evident. Much work has been carried out with these objectives in mind. However, as far as is known, such work has been performed either by placing substances in the vicinity of wild Zebra mussels present in the Great Lakes or by experimenting on captive Zebra mussels prior to their expiration within some ten days of being removed from the Great Lakes. Hitherto Zebra mussels have not been maintained in captivity in a laboratory setting for extended periods of time. It is well known that research into the control of an organism, whether it is the AIDS virus or the Zebra mussel, is most effectively performed on organisms that are maintained in the laboratory.

Accordingly, the object of the present invention is a method and procedure for maintaining captive Zebra mussels in a healthly state for extended periods.

SUMMARY OF THE INVENTION

The foregoing and other objects and advantages are achieved with the process disclosed below. The preferred embodiment of the process comprises securing live wild Zebra mussels from the costal waters of the Great Lakes; submerging the Zebra mussels in aerated, water-containing vessels; and feeding the Zebra mussels processed brine shrimp on a daily basis.

DETAILED DESCRIPTION OF THE INVENTION AND ITS PREFERRED EMBODIMENT

The present invention is a process for maintaining and sustaining Zebra mussels and does not lend itself to visual description. Thus no drawings are shown.

The preferred embodiment of the present invention was arrived at only after extensive experimentation. Although Zebra mussels thrive in the Great Lakes, they prove difficult to keep alive in a laboratory setting.

The Zebra mussels are kept captive by submerging them in aerated, water-containing vessels such as aquariums. Aeration is provided by conventional pump means such as those used to provide fish with dissolved air. During experimentation, about 300 live Zebra mussels were submerged in each water-containing vessel. A relatively large volume of water was used for food and oxygen circulation.

After extensive experimentation, it proved possible to feed captive Zebra mussels on a diet of processed brine shrimp. To feed about 300 Zebra mussels a day, about 4 to 6.5 cubic centimeters of compressed, freeze-dried brine shrimp are placed in about 4½ cups (1065 ml) of water. This is about 1.4 cc to 2.1 cc of compressed brine shrimp per 100 live Zebra mussels per day. Each 100 live Zebra mussels should receive at least approximately 1.4 cc of compressed brine shrimp per day. The mixture of water and brine shrimp is placed in a blender or mixer and vigorously agitated forming an essentially homogeneous suspension, hereafter called a "shrimp shake". Agitation must continue until the brine shrimp is in suspension. The shrimp shake is placed in the vessel containing the Zebra mussels. To assist in maintaining an approximately constant volume of water in a confining vessel, the water portion of the shrimp shake may be removed from the confining vessel.

The amount of water used in the shrimp shake is not critical. It should be sufficient to insure that the agitation produces an essentially homogeneous suspension. The ratio, by volume, of compressed brine shrimp to water may range from approximately 1:10 to in excess of 1:250.

While the preferred embodiment of the present invention was mainly used once a day, it was found that longer periods between feeding could be used if the amount of brine shrimp was increased somewhat. Zebra mussels are hardy and feeding periods of up to three days appeared to cause no ill effects. It is expected that Zebra mussels could be fed proportionally smaller amounts two or three times a day.

Long-term viability of the preferred embodiment of the present invention has been established. The use of more than about 6.5 cc of shrimp per day per 300 Zebra mussels results in a noticeable increase in the opacity of the vessel's water and is not recommended though even such rations are effective. The size of the confining vessel appears to have little, if any, influence probably because of the circulation of water in the vessel. The temperature of the confining vessels was at or slightly below room temperature.

An alternative embodiment of the present invention that appears to provide medium term effectiveness at a relatively high cost consists of daily adding approximately 20 cubic centimeters of a product sold under the trade name "Liquifry" made by INTERPET of Dorking, Surrey, England, United Kingdom to a vessel containing about 300 Zebra mussels. The containers of "Liquifry" state that they contain: "dextrin, pea flour, whole egg, yeast[, and] sulphurous acid". Long term effectiveness of this product has not been established.

It was possible, using the preferred embodiment of the present invention, to test a large number of potential anti-fouling substances such as glass, beeswax, polytetrafluoroethylene, and various other synthetic polymers. The only coating found to repel the attachment of Zebra mussels was a layer of common petroleum jelly (such as sold under the trade name Vaseline). Unfortunately, it is difficult to maintain a layer of such material under water.

The preferred embodiment and an alternate embodiment of the present invention have been described in detail. The embodiments described are illustrative and not restrictive.

I claim:

1. A process for sustaining a quantity of Zebra mussels submerged in a water-containing vessel comprising the steps of:
    forming a ration of compressed brine shrimp appropriate for the quantity of Zebra mussels to be sustained;
    combining said ration with at least ten times the volume of water to form a mixture;
    agitating said mixture vigorously to form a suspension; and
    adding said suspension to the water-containing vessel.

2. A process as recited in claim 1, further comprising the step of:
    aerating the water-containing vessel continually.

3. A process as recited in claim 1, further comprising the step of:
    maintaining the temperature of the water-containing vessel at or slightly below room temperature.

4. A process as recited in claim 1, where said adding step further includes adding said mixture to the water-containing vessel at least once every three days.

5. A process as recited in claim 1, where said appropriate ration of said forming step comprises between about 1.4 cc and about 2.1 cc of compressed brine shrimp per 100 live Zebra mussels.

6. A process as recited in claim 5, where said adding step further includes adding said mixture to the water-containing vessel once a day.

7. A process as recited in claim 1, where said appropriate ration of said forming step comprises at least 1.4 cc of compressed brine shrimp per 100 live Zebra mussels per day.

8. A process for sustaining Zebra mussels submerged in a water-containing vessel for extended periods of time, comprising the steps of:
    combining at least 1.4 cc of compressed brine shrimp per 100 live Zebra mussels with at least ten times the volume of water to form a mixture;
    agitating said mixture vigorously to form a suspension; and
    adding said mixture to the water-containing vessel once per day.

9. A process as recited in claim 8, further comprising the step of: aerating the water-containing vessel continually.

10. A process as recited in claim 8, further comprising the steps of:
    maintaining the temperature of the water-containing vessel at or slightly below room temperature.

11. A process as recited in claim 8, further comprising the steps of:
    withdrawing some of the water needed in said combining step from the water-containing vessel prior to said combining step; and
    using said withdrawn water in said combining step.

12. A process for sustaining Zebra mussels for extended periods of time, comprising the steps of:
    submerging live Zebra mussels in a water-containing vessel;
    aerating said water-containing vessel continually;
    combining between about 1.4 cc and about 2.1 cc of compressed brine shrimp per 100 live Zebra mussels with at least 21 ml of water to form a mixture;
    agitating said mixture vigorously to form a suspension; and
    adding said mixture to said water-containing vessel once per day.

13. A process as recited in claim 12, further comprising the step of:
    maintaining the temperature of the water-containing vessel at or slightly below room temperature.

* * * * *